May 16, 1939. W. J. MONTGOMERY ET AL 2,158,080
APPARATUS FOR AND METHOD OF SCREENING
Filed Jan. 30, 1936 2 Sheets-Sheet 1
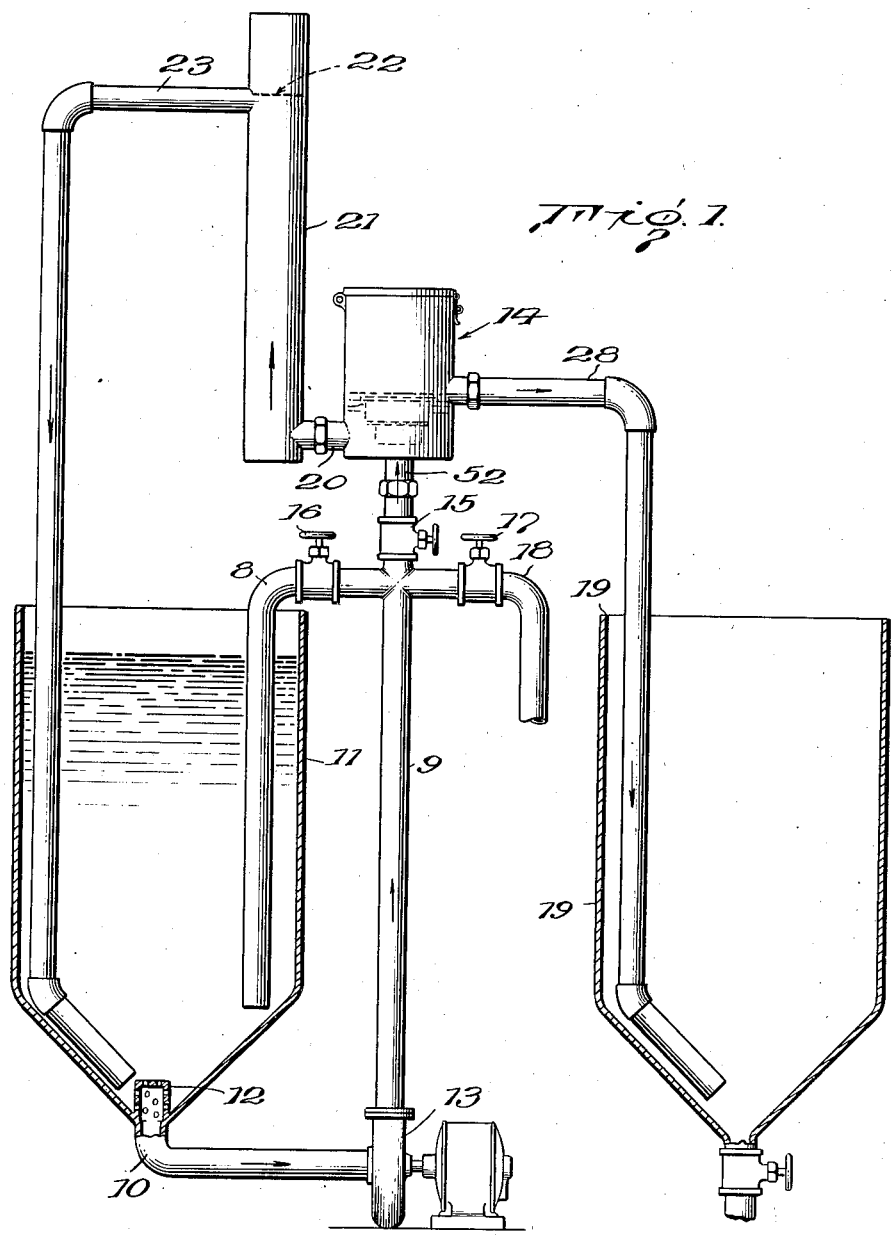
Inventors
William J. Montgomery
Charles F. Boyers,
By K. P. McElroy
Attorney

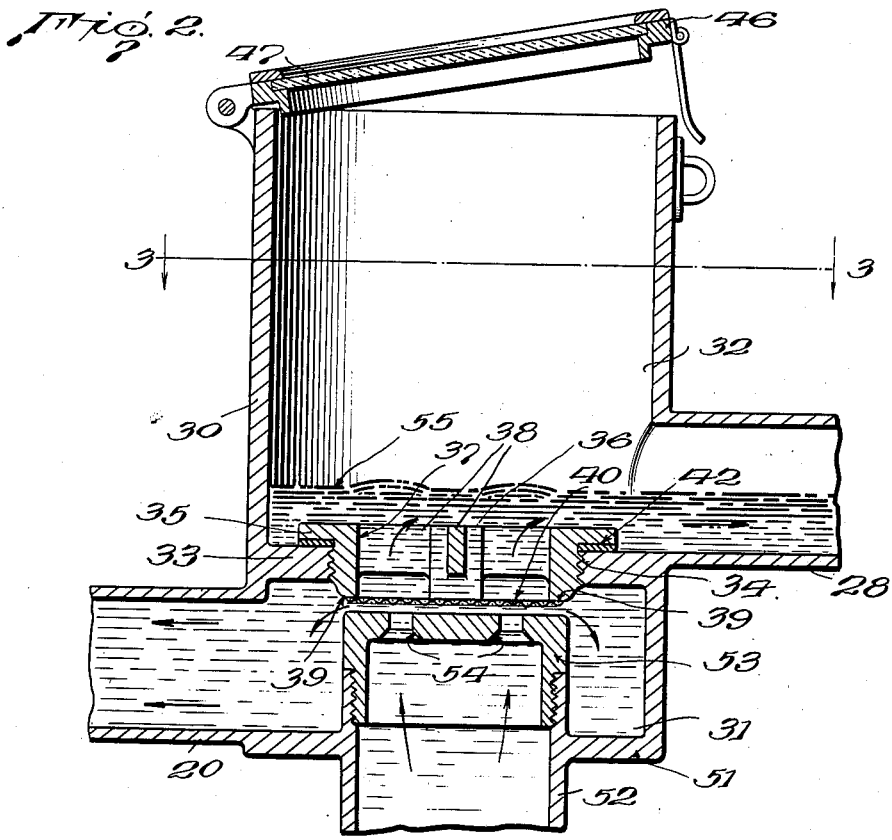
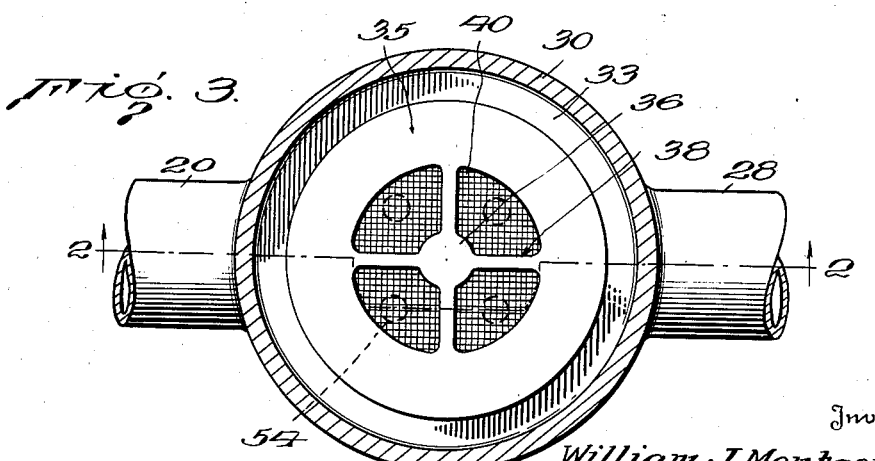

Patented May 16, 1939

2,158,080

UNITED STATES PATENT OFFICE 2,158,080

APPARATUS FOR AND METHOD OF SCREENING

William J. Montgomery, Hamilton, and Charles F. Boyers, Hillsboro, Ohio, assignors to The Champion Paper and Fibre Company, Hamilton, Ohio, a corporation of Ohio Application January 30, 1936, Serial No. 61,629

8 Claims. (Cl. 210—167)

This invention relates to methods of and apparatus for screening; and it comprises a method of screening liquid suspensions of fine solid particles which comprises playing a submerged jet or jets of such a suspension against a screen in excess of the amount which will pass through the screen whereby the screen is kept clean, continuously removing and recirculating excess and drawing off screened suspension, and maintaining the screen submerged in liquid to prevent foaming, the liquid on the jet side of the screen being maintained at substantially higher pressure than that on the opposite side; and it further comprises an apparatus suitable for carrying out such method and having a casing, a screen therein arranged to divide the casing into an inlet chamber and an outlet chamber, nozzles in the inlet chamber opposed to the screen, means for forcing liquid suspension through the nozzles, means for maintaining bodies of liquid in both chambers submerging the screen, means for maintaining a pressure differential between said bodies of liquid tending to force unscreened liquid through the screen, and means for drawing off screened liquid from the outlet chamber and excess unscreened liquid from the inlet chamber; all as more fully hereinafter set forth and as claimed.

Screening or sieving is a step in many kinds of processes. For example, in the art of making coating compositions in the manufacture of coated paper, one step is to screen aqueous suspensions of various pigments such as clay, calcium carbonate, etc., in order to remove all particles larger than a specified maximum size. The present invention, while applicable to various processes, will for the sake of simplicity be described mainly in connection with screening coating materials. For such work it is a desideratum to use screens of very fine mesh; for example 100 to 400 meshes per linear inch; though hitherto it has not been generally practicable to use screens much finer than 100 mesh for such work. Even methods and apparatus which functioned at all for screening finer than about 100 mesh were slow, inefficient and expensive; they usually involved the use of vibrators or rotating screens and were attended with difficulties due to foaming, clogging and breaking of expensive screens of large areas.

The present invention provides a method and apparatus for fine screening at a rapid rate with a small screen area and in which foaming and clogging difficulties are eliminated.

Considering the method in detail: we take the unscreened liquid suspension from a suitable source thereof, and continually play it as a submerged, high velocity jet or jets against a submerged screen. Since the jets and screen are out of contact with the air there is no opportunity for the formation of foam which sometimes retards or completely prevents the passage of liquid through fine screens. Liquid containing particles smaller than the screen mesh passes through the screen and is removed, but we provide that a body of the screened suspension is always in contact with one side (outlet side) of the screen. The rate of feed of unscreened suspension is so regulated as to be in considerable excess of the rate of passage through the screen, so that a strong flow of unscreened suspension plays violently over the screen surface and keeps it clean. The excess is drawn off and is recirculated.

Furthermore we maintain a pressure differential between the liquid bodies on the two sides of the screen in a direction tending to force unscreened liquid through the screen. We find that, in general, neither the jet nor the pressure differential alone will cause a continuous passage of liquid through the screen, but that both are essential. Under any given set of conditions of flow, viscosity, etc., we find that as the pressure differential is increased from zero, the screening rate increases to a maximum and then decreases. In any particular case this optimum value of the pressure differential can readily be determined by trial.

The jet velocity also affects the screening rate. Other things being equal, as the jet velocity is increased from zero the screening rate increases first quite rapidly and then more slowly. At very high rates wear of the screen may be objectionably increased. Accordingly, we adjust the jet velocity at a rate somewhat below that giving the maximum screening rate. The best velocity can be determined by observing the increase in screening rate as the jet velocity is increased, and setting the jet velocity at the point where the increase in screening rate with jet velocity begins to fall off.

The adjustment of jet force and of differential pressure are substantially independent. As an example, in screening a paper coating composition composed of clay suspended in an aqueous solution of casein, the whole containing about 40 per cent solids, through screens of 325 meshes per linear inch, we use static pressure heads on the screened and unscreened liquid in contact with the screen, of 2 inches and 50 inches respectively, and a jet velocity in excess of 20 feet per second, supplying liquid to the screen at a rate equal to at least five times the screening rate. By this means we are able to screen such suspensions through screens of this fineness at rate as high as 10 pounds per minute per square inch of exposed screen area or 33 pounds per minute per square inch of open area of the screen. If such high rates are not required screen life is lengthened by reducing the jet velocity and consequently the screening rate.

We have developed an apparatus which is exceptionally well adapted for carrying out the method. One example of a specific embodiment of the invention is shown, more or less diagrammatically, in the accompanying drawings, in which, Fig. 1 is a diagrammatic view showing the screening device and the piping system for supplying liquid thereto and removing it therefrom;

Fig. 2 is a central section, taken on line 2—2 of Fig. 3, showing the construction of a screening device embodying the invention;

Fig. 3 is a horizontal section of the same device taken on line 3—3 of Fig. 2; and Fig. 4 shows an alternative construction for providing adjustment of the pressure head on the unscreened liquid.

The general arrangement of the device and its connections with the supplies of unscreened and screened liquid are best seen by reference to Fig. 1. A tank 11 of any suitable size and form is provided for holding a supply of an unscreened liquid suspension of solid particles. The tank is provided with a lower outlet conduit 10, covered by a relatively coarse strainer 12 to keep foreign objects out of the motor-driven pump 13 which is advantageously of the centrifugal type as shown in the drawings, and removes the liquid from tank 11 and supplies it through a conduit 9 to the screening device 14, which will be hereinafter more fully described. The flow from the pump to the screening device can be controlled by a valve 15 in conduit 9. Or the speed of the pump motor can be varied to adjust the flow. A branch conduit 8 provided with a valve 16 affords means for by-passing the screening device and returning the liquid directly to tank 11, if desired, and a branch conduit 18 having a valve 17 provides an outlet to the sewer to provide means for disposing of wash water or other unwanted liquid when it is desired to clean out tank 11.

Liquid which has passed through the screen in the screening device 14 passes out through a pipe 28 to a suitable tank 19 from which it may be withdrawn as required.

For reasons hereinbefore pointed out the pump 13 is of a capacity which will supply liquid much more rapidly then it can pass through the screen in the screening device 14. The excess of liquid supplied by pump 13 above that which can pass through the screen, passes out through a pipe 20 into an open-topped stand-pipe 21 which is arranged to keep the unscreened liquid under a predetermined pressure head. As illustrated in Fig. 1 this is accomplished by placing an overflow pipe 23 at a height equal to the pressure head desired for the particular installation. In a typical operation, liquid is maintained in the standpipe at about the level indicated at 22. The overflow pipe 23 carries the unscreened liquid back to the tank 11, as shown.

If it is desired to vary the pressure head on the unscreened liquid in the screening device 14 it can be increased by inserting a valve in pipe 20, but to prevent excessively high pressure we prefer to use an adjustable spring tensioned or weight controlled outlet valve which can be adjusted according to the pressure head desired. A device of this character is shown in Fig. 4. Here the standpipe 21 is replaced by a downwardly directed pipe 24 in which is inserted a pressure controlling valve 25, which for illustration, is shown in the form of an ordinary swing check valve in which the swinging gate is provided with an adjustable counterweight 26 so that it resists the escape of liquid from the screening device in accordance with the setting of the weight 26, which can then be used to adjust the pressure head on the unscreened liquid in screening device 14.

The construction of the screening device itself is best seen in Figs. 2 and 3. The device is enclosed in a casing or housing 30 which is divided into a lower chamber 31 and an upper chamber 32 by a partition 33. In this partition is a threaded opening 34.

An annular frame 35 is provided for supporting the screen in place. The frame is made with a column 36 supported centrally in opening 37 by ribs 38. The lower face 39 of the rim of the annular frame and the central column of frame 35 is finished flat to receive a circular screen 40 which is fastened securely thereto by any suitable means. When using wire screens it is best to solder them completely around the rim as well as in the center thus preventing leakage of unscreened liquid around the edges; although other means of attachment can be used if desired. If screen 40 is so fine that it is too frail by itself it may be strengthened by mounting a screen of coarser mesh above it, i. e., on the side towards the screened liquid. An annular area of open screen is exposed for use (Figs. 2 and 3). Ribs 38 are so arranged as not to come close to the screen, so that they do not interfere with the free passage of liquid through any part of it. To prevent leakage of unscreened liquid around the threads on frame 35 a gasket 42 may be used. Preferably there is provided a number of spare frames 35 with screens already secured thereto, so that screens can be easily and quickly renewed when broken or worn out in service, by simply screwing out one frame 35 and inserting another in its place.

With the arrangement shown, only small pieces of the expensive fine screens are required.

The screen is shown in the specific embodiment as positioned horizontally, although other positions may be used if desired.

Into the bottom 51 of the housing 30 is welded, or otherwise securely fastened, inlet pipe 52 in communication with conduit 9 (see also Fig. 1). In the upper end of the inlet pipe, and in close proximity to screen 40, is screwed an orifice plate 53 with any suitable number of orifices 54 distributed around a circle approximately in the middle of the annular open area of screen 40. As shown, these orifices are conveniently arranged to direct the jets normally to the screen, but they can be arranged at other angles if desired. The distance of the orifices from the screen is usually small. In general the best distance is usually found to be between one-half and three times the orifice diameter, but a considerable latitude in choice of distances is possible if the hydrostatic pressure heads on the unscreened liquid in chamber 31 and in supply pipe 52 are adjusted accordingly. Almost all the screening takes place within a small area around each jet. For each jet a screen area of 3 or 4 times the orifice diameter is usually ample.

The outlet pipe 28 for the liquid which has been screened leads from the bottom of chamber 32 above screen 40, and carries the screened liquid to tank 19 as has been described. From Fig. 2 it is apparent that as long as chamber 31 below screen 40 is filled with liquid under pressure the liquid above the screen must be deep enough to reach at least to the upper surface of frame 35. Thus a minimum pressure head of this amount is maintained on the upper surface of screen 40, thus giving assurance that the screen will be at all times completely submerged. During operation the liquid level will rise above this point to a height depending on the rate of screening and the capacity of outlet pipe 28. For purposes of illustration the operating level is indicated at 55 in Fig. 2, though it should be understood that when in operation the level may be below or above the point shown, even, in some cases, entirely submerging the entrance to conduit 28. This small change in pressure head above the screen has no appreciable effect on the screening operation, since an adequate minimum head is always maintained as already pointed out.

The adjustments for the pressure in chamber 31, and for the jet force (valve 15 or pump 13 or both) can be made independently of each other. In apparatus designed for use always with a particular kind of suspension under the same conditions, either or both of these adjustments can be omitted.

The outlet pipe 20 for the excess of liquid introduced through the supply pipe 52, leads from the bottom of chamber 31 below screen 40 (see Figs. 1, 2, and 3).

Chamber 30 is provided with a hinged cover 46, shown as partly open, which is preferably provided with a wireglass or unbreakable glass window 47 to permit observation of the flow through the screen.

The construction shown is well adapted to facilitate cleaning of the device. Lifting lid 46 and unscrewing frame 35 which carries screen 40 affords easy access to the entire interior of the device. It is also a simple matter to unscrew orifice plate 53 in case cleaning should at any time become necessary.

In case it is desired to screen more liquid than is possible with a unit such as that described, several such units can be provided, or larger units provided with larger screens and more jets could be made. Usually it is simpler and more convenient, to provide a plurality of screening elements in a chamber with connections common to all of the elements.

The method and apparatus described have been found to be highly efficient in screening liquid suspensions having high concentrations of solids and relatively high viscosities through very small areas of fine screens at exceedingly rapid rates and with remarkably small breakage in extensive commercial operation.

For example, one device equipped with a plurality of 200 mesh screens had a combined gross screen area (including screen area used for soldering to the frames 35) of less than 58 square inches and a net free screen area of about 40 square inches leaving a net open area of only 11.6 square inches. With this device it was found easily possible to screen a slurry containing about 43 per cent of dry clay by weight, at a rate of more than three tons of dry clay (eight tons of liquid) per hour. By the methods heretofore known and with the apparatus heretofore available it is necessary to use screens of many times this area and of coarser mesh to secure comparable screening rates, whereas in attempts to use the finer meshes it is practically impossible to secure any practical results.

We do not wish to be understood as limiting our device to use with aqueous suspensions as it may be applied to suspensions in different kinds of fluids, nor is our device limited to use with suspensions of pigments as it may also be used with suspensions of many different types of solids whether finely divided or fibrous, if screens of appropriate size and type are used. These may be wire of any suitable weave or metal with any suitable type of perforations or slits. The invention is applicable to coarse as well as to fine screening.

When pressure heads on screened liquid, and on unscreened liquid against the screen or behind the orifice plate are mentioned it is to be understood that the absolute pressure may vary within considerable limits so long as the relative pressures at the points mentioned are held within the proper limits. For example it might be advisable, in some cases, to have the entire system operating under a vacuum, and in other cases, under considerable pressure.

The apparatus described is what we now regard as the best embodiment of the invention. Changes in dimensions and form of the various elements may be made to suit particular requirements. In the method, the rates of flow, etc., can be varied for particular applications of the invention.

The term "orifice" is used in the specification and claims to designate a constricted opening which forms an outlet from a considerably larger passage, and is adapted to impart a high and substantially accelerated velocity to fluid issuing therefrom.

The term "jet" is used to denote a relatively small stream of fluid issuing at substantially increased velocity from a region where it is under pressure, into a region of materially lower pressure.

The term "submerged jet" is used to designate a jet in which the fluid issues into a region filled with the same kind of fluid and does not come into contact, nor mix with other fluids, specifically air.

The term "screening" is used to mean controlled separation of relatively fine solid particles from coarser particles, as distinguished from "filtering", which means the separation of all solid particles from liquids in which they are suspended.

What we claim is:

1. Method of using a fine mesh screen to separate fine solid particles in liquid suspension, from oversize particles which comprises maintaining the screen completely submerged between a body of screened liquid on one side thereof and a body of unscreened liquid at substantially greater pressure on the other side thereof, projecting a submerged jet of unscreened liquid through the body of unscreened liquid which is at the greater pressure, against the screen at high velocity and in considerable excess over the amount which passes through the screen, and collecting the screened liquid containing the fine particles.

2. Method of using a fine mesh screen to separate oversize particles from liquid suspensions of fine solid particles, which comprises maintaining the screen completely submerged between a body of screened liquid on one side thereof and a body of unscreened liquid at substantially greater pressure on the other side thereof, projecting a submerged jet of unscreened liquid through the body of unscreened liquid which is at the greater pressure, against the screen at high velocity and in considerable excess over the amount which passes through the screen, and correlating the jet velocity and the pressure difference on opposite sides of the screen to give an optimum screening rate.

3. Method of claim 2 in which the excess of unscreened liquid is recirculated out of contact with air, whereby substantially all of the particles of the requisite fineness may be caused to pass through the screen.

4. Method of using a screen having at least 100 meshes per linear inch to separate oversize particles from liquid suspensions containing at least 20 per cent by weight of fine solid particles, which comprises maintaining the screen completely submerged between a body of screened liquid on one side thereof and a body of unscreened liquid on the other side thereof, maintaining a static pressure of a predetermined amount, at least 1 pound per square inch, greater on said body of unscreened liquid than that on said body of screened liquid, and projecting a submerged jet of unscreened liquid through said body of unscreened liquid, against the screen at a velocity in excess of 20 feet per second.

5. An apparatus for screening liquid suspensions of fine solid particles, comprising a tank for unscreened liquid, means for removing unscreened liquid therefrom, a conduit through which liquid so removed may pass, at least one orifice forming a materially restricted outlet from said conduit, a fine mesh screen closely adjacent said outlet, a chamber adjacent said screen and surrounding said outlet, a conduit returning from said chamber to a point below the level of liquid in said tank, and means associated with said last named conduit for maintaining a predetermined static pressure head in said chamber.

6. Apparatus of claim 5 in which means is provided for correlating the velocity with which the fluid issues through the orifice and the static pressure head in the chamber into which the fluid issues.

7. A device for screening liquid suspensions of solid particles, comprising a conduit through which fluid may be supplied to the device, at least one orifice forming a substantially restricted outlet from said conduit, a fine mesh screen closely adjacent said outlet, a chamber surrounding said outlet and adjacent said screen, an outlet from said chamber, means associated with said outlet for maintaining a predetermined static pressure in said chamber, and means for maintaining said screen submerged in liquid during operation of the device.

8. A device for screening liquid suspensions of fine solid particles comprising a chamber for screened liquid, a chamber for unscreened liquid, a partition separating said chambers, an opening through said partition, a demountable frame adapted to cover said opening, a fine mesh screen replaceably attached to said frame in such manner that when said frame is in place, liquid can only pass from one of said chambers to the other by passing through said screen, an outlet from each of said chambers, and an inlet to the chamber for unscreened liquid, said inlet being formed as a constricted orifice facing said screen in close proximity thereto.

WILLIAM J. MONTGOMERY.
CHARLES F. BOYERS.